US011528672B2

United States Patent
Xiong et al.

(10) Patent No.: US 11,528,672 B2
(45) Date of Patent: Dec. 13, 2022

(54) LONG TRANSMISSION DURATION FOR WIRELESS SYSTEMS

(71) Applicant: Intel Corporation, Santa Clara, CA (US)

(72) Inventors: Gang Xiong, Beaverton, OR (US); Avik Sengupta, San Jose, CA (US); Yushu Zhang, Beijing (CN); Jie Zhu, San Jose, CA (US); Dae Won Lee, Portland, OR (US); Alexei Vladimirovich Davydov, Nizhny Novgorod (RU); Gregory Vladimirovich Morozov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 17/251,630

(22) PCT Filed: Aug. 16, 2019

(86) PCT No.: PCT/US2019/046902
§ 371 (c)(1),
(2) Date: Dec. 11, 2020

(87) PCT Pub. No.: WO2020/037257
PCT Pub. Date: Feb. 20, 2020

(65) Prior Publication Data
US 2021/0250887 A1    Aug. 12, 2021

Related U.S. Application Data

(60) Provisional application No. 62/719,430, filed on Aug. 17, 2018.

(51) Int. Cl.
*H04W 48/20* (2009.01)
*H04W 56/00* (2009.01)
(Continued)

(52) U.S. Cl.
CPC ....... *H04W 56/0015* (2013.01); *H04L 5/0094* (2013.01); *H04W 48/20* (2013.01); *H04W 88/02* (2013.01)

(58) Field of Classification Search
CPC ..... H04W 48/10; H04W 48/12; H04W 48/16; H04W 48/20; H04W 48/50; H04W 56/00;
(Continued)

(56) References Cited

U.S. PATENT DOCUMENTS

2017/0311296 A1* 10/2017 Onggosanusi ....... H04B 7/0456
2018/0343156 A1* 11/2018 Malik .................. H04B 7/0695
(Continued)

FOREIGN PATENT DOCUMENTS

WO    WO-2016203290 A1    12/2016
WO    WO-2017155239 A2     9/2017
(Continued)

OTHER PUBLICATIONS

"International Application Serial No. PCT/US2019/046902, International Search Report dated Dec. 4, 2019", 3 pgs.
(Continued)

*Primary Examiner* — Jean A Gelin
(74) *Attorney, Agent, or Firm* — Schwegman Lundberg & Woessner, P.A.

(57) ABSTRACT

An apparatus of a user equipment (UE) includes processing circuitry, where to configure the UE for New Radio (NR) communications above a 52.6 GHz carrier frequency, the processing circuitry is to decode higher layer signaling, the higher layer signaling including a default slot duration for a transmission of control signaling. The control signaling includes a synchronization signal (SS) and a physical broadcast channel (PBCH) signaling. Synchronization information within a SS block is decoded. The SS block is received within a SS burst set and occupying a plurality of symbols
(Continued)

within a slot having the default slot duration. A synchronization procedure is performed with a next generation Node-B (gNB) based on the synchronization information within the SS block and the PBCH signaling.

20 Claims, 7 Drawing Sheets

(51) Int. Cl.
*H04L 5/00* (2006.01)
*H04W 88/02* (2009.01)

(58) Field of Classification Search
CPC ......... H04W 56/0015; H04W 72/1273; H04W 72/044; H04W 72/005; H04W 88/02; H04L 5/00; H04L 5/0053; H04L 5/0094; H04L 27/2678
See application file for complete search history.

(56) References Cited

U.S. PATENT DOCUMENTS

| | | | |
|---|---|---|---|
| 2019/0123992 A1* | 4/2019 | Ly | H04W 72/042 |
| 2020/0045737 A1* | 2/2020 | Ly | H04L 1/1816 |
| 2020/0067640 A1* | 2/2020 | Hui | H04L 1/0047 |
| 2020/0215119 A1* | 7/2020 | Liu | A61K 36/9066 |
| 2020/0280337 A1* | 9/2020 | Yi | H04L 1/1861 |
| 2021/0068153 A1* | 3/2021 | Seo | H04W 4/40 |
| 2021/0136800 A1* | 5/2021 | Li | H04W 72/005 |
| 2021/0168574 A1* | 6/2021 | Zhang | H04W 56/001 |

FOREIGN PATENT DOCUMENTS

| | | |
|---|---|---|
| WO | WO-2017192019 A1 | 11/2017 |
| WO | WO-2017213420 A1 | 12/2017 |

OTHER PUBLICATIONS

"International Application Serial No. PCT/US2019/046902, Written Opinion dated Dec. 4, 2019", 4 pgs.
"New SID: Study on NR design above 52.6", RP-180931, 3GPP TSG RAN Meeting #80, La Jolla, USA, (Jun. 4, 2018).
"International Application Serial No. PCT/US2019/046902, International Preliminary Report on Patentability dated Mar. 4, 2021", 6 pgs.

* cited by examiner

LONG TRANSMISSION DURATION FOR WIRELESS SYSTEMS

PRIORITY CLAIM

This application is a U.S. National Stage Filing under 35 U.S.C. 371 from International Application No. PCT/US2019/046902, filed Aug. 16, 2019 and published in English as WO 2020/037257 on Feb. 20, 2020, which claims the benefit of priority to U.S. Provisional Patent Application Ser. No. 62/719,430, filed Aug. 17, 2018, and entitled "LONG TRANSMISSION DURATION FOR SYSTEMS OPERATING ABOVE 52.6 GHZ CARRIER FREQUENCY," each of which provisional patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for long transmission duration for systems operating at above 52.6 GHz carrier frequency.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATS) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for providing long transmission duration for systems operating at above 52.6 GHz carrier frequency.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
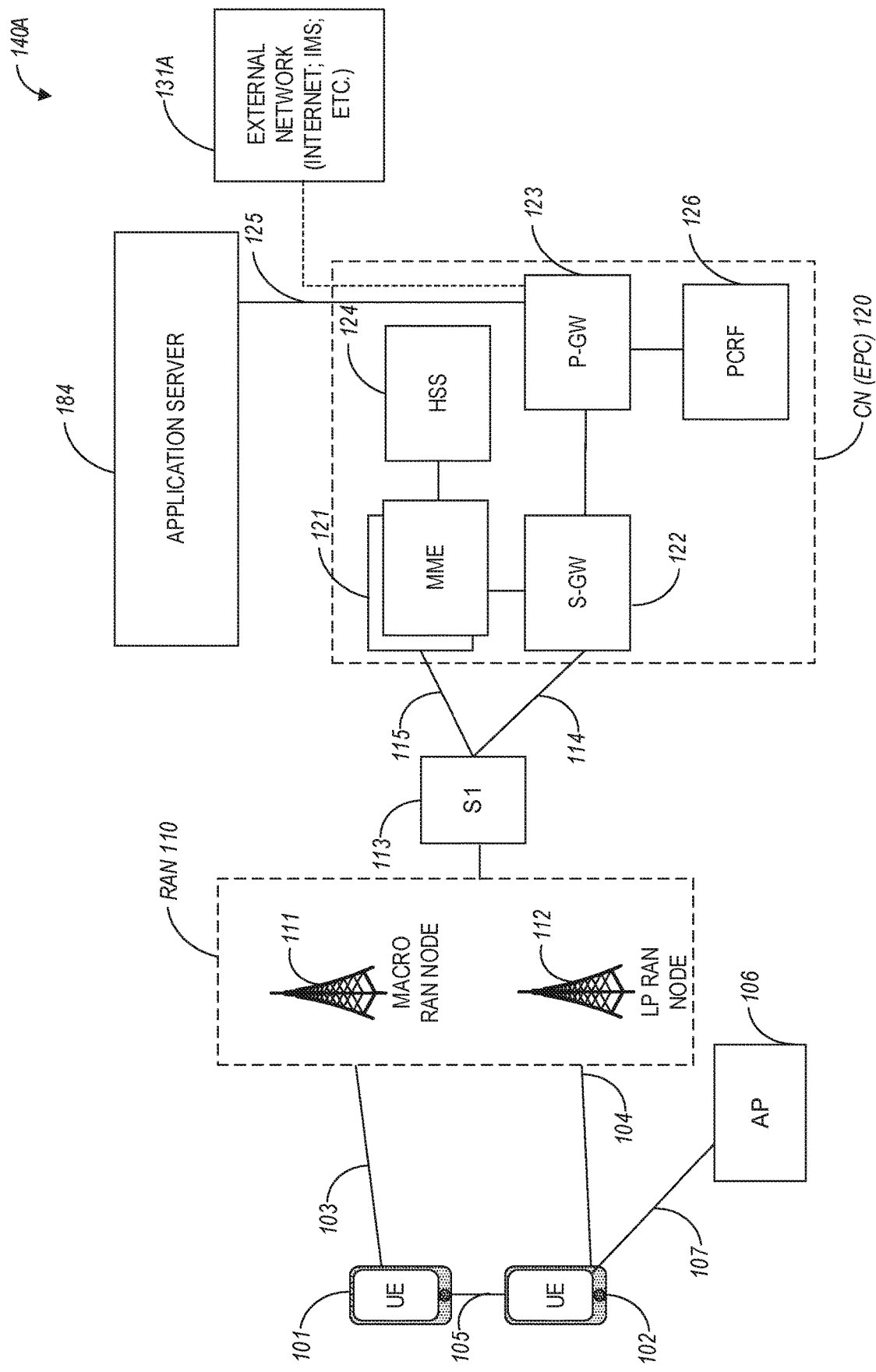
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the LTEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or MT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network. One of the current enablers of IoT is the narrowband-IoT (NB-IoT).

A NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
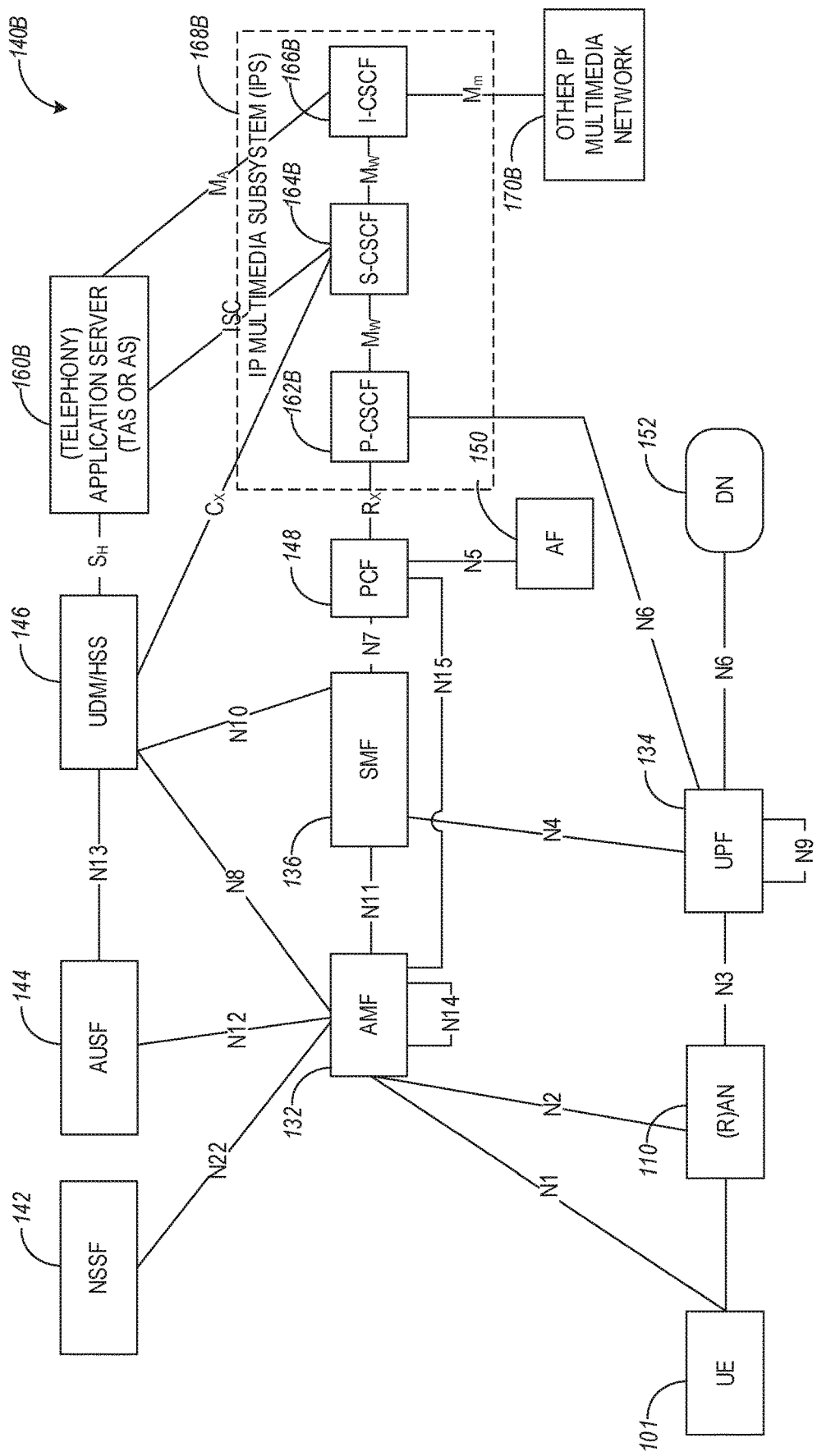
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to a network policy. The UPF 134 can be deployed in one or more configurations according to a desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 1409 includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 19), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
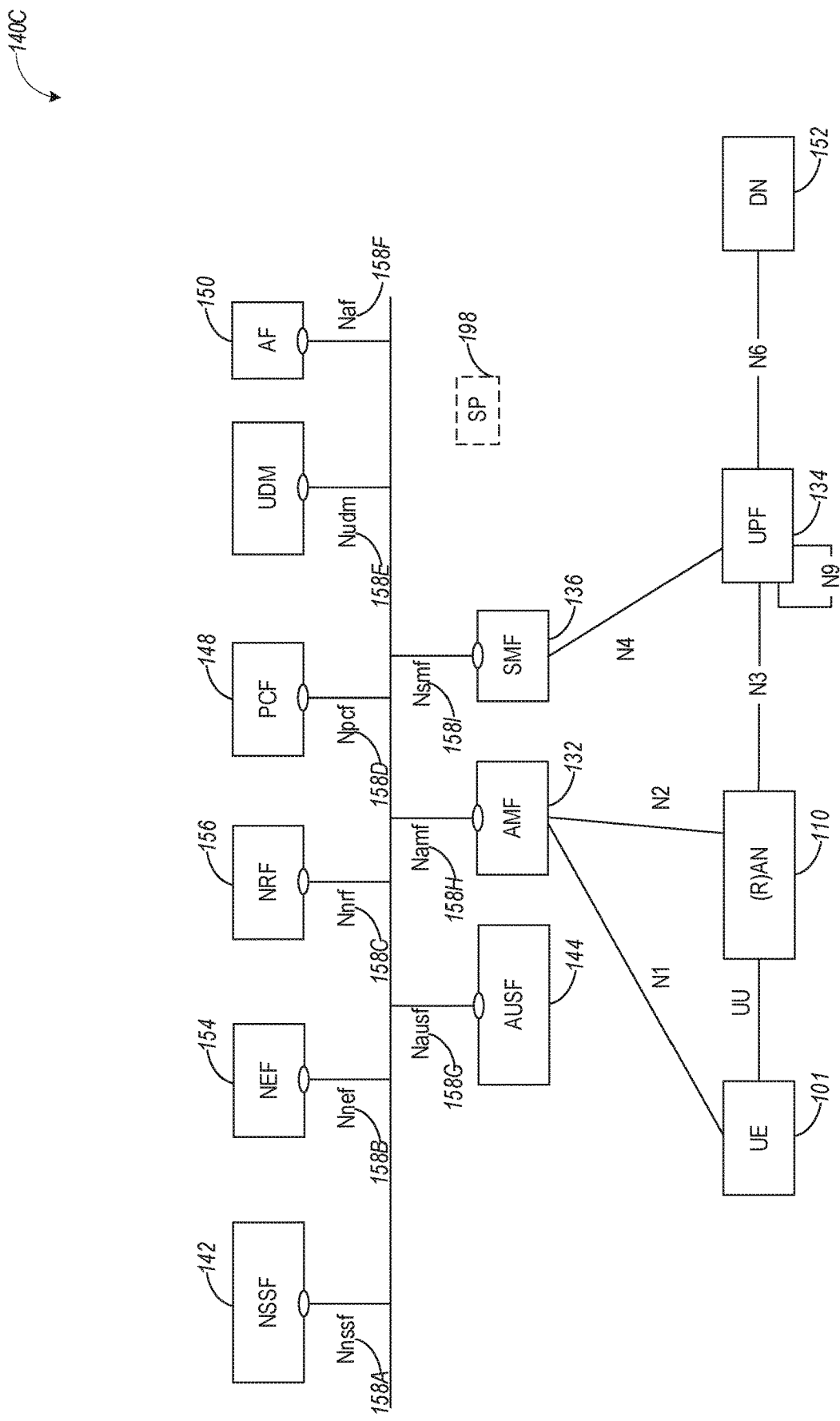

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In NR Release 15, system design is based on carrier frequencies up to 52.6 GHz with a waveform choice of the cyclic prefix—orthogonal frequency-division multiplexing (CP-OFDM) for downlink (DL) and uplink (UL), and additionally, Discrete Fourier Transform-spread-OFDM (DFT-s-OFDM) for UL. In some aspects, for carrier frequencies above 52.6 GHz, a single carrier based waveform can be used in order to handle issues including low power amplifier (PA) efficiency and large phase noise.

Figure 2:
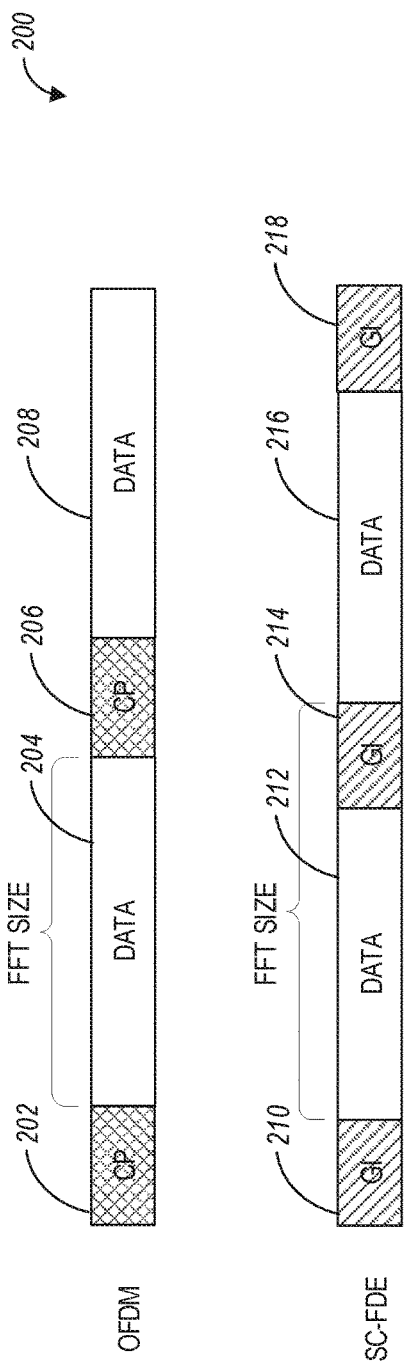
FIG. 2 illustrates a comparison between OFDM and SC-FDE transmission schemes, in accordance with some aspects.

In some aspects, for single carrier based waveform, DFT-s-OFDM and single carrier with frequency domain equalizer (SC-FDE) can be considered for both DL and UL communication. FIG. 2 illustrates a comparison 200 between OFDM and SC-FDM transmission schemes, in accordance with some aspects. For OFDM based transmission scheme, including DFT-s-OFDM, a cyclic prefix (CP) (e.g., 202 and 206) is inserted at the beginning of each data block (e.g., 204 and 208), where the last data symbols in a block are repeated as the CP. Typically, the length of the CP exceeds the maximum expected delay spread in order to overcome the inter-symbol interference (ISI).

For the SC-FDE transmission scheme, a known sequence (guard interval (GI), unique word (UW), etc.) (e.g., GIs 210, 214, 218) or cyclic prefix (CP) can be inserted at both the beginning and/or the end of one block (e.g., data blocks 212, 216). In some aspects, a linear equalizer in the frequency domain can be employed to reduce the receiver complexity. Compared to OFDM, the SC-FDE transmission scheme can reduce the Peak to Average Power Ratio (PAPR) and thus allow the use of less costly power amplifiers.

Figure 3:
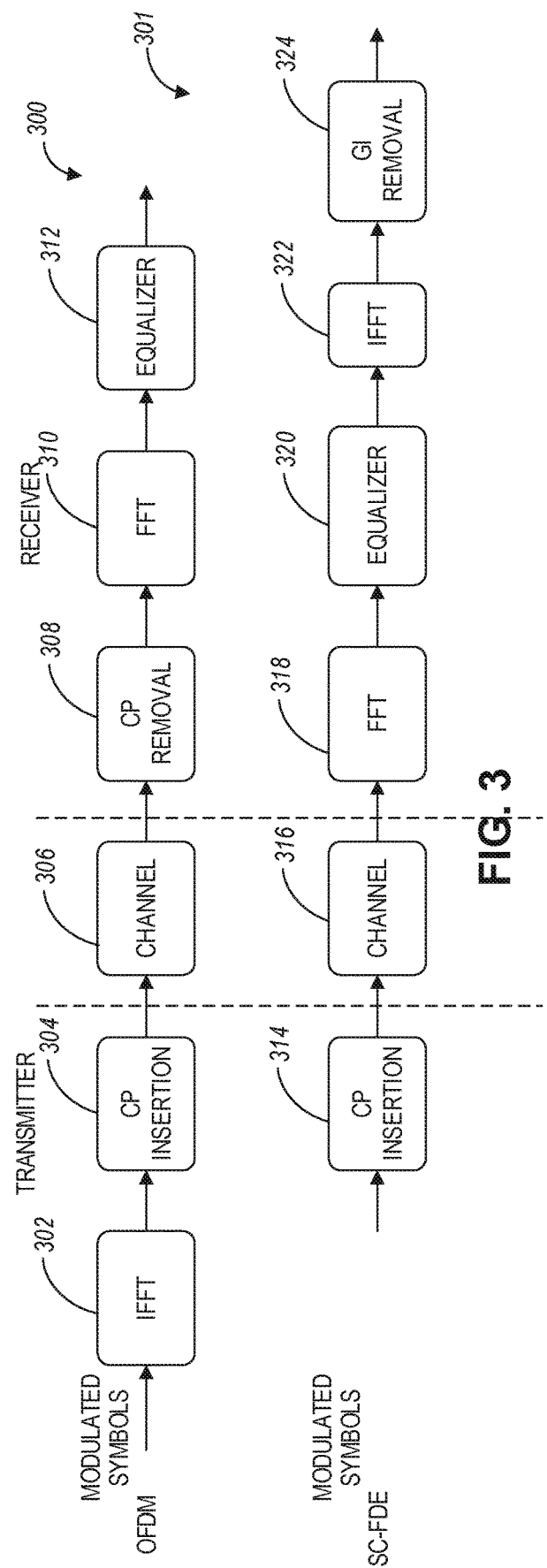
FIG. 3 illustrates transmitter and receiver structures for OFDM and SC-FDE communications, in accordance with some aspects.

FIG. 3 illustrates transmitter and receiver structures for OFDM and SC-FDE communications, in accordance with some aspects. Referring to FIG. 3, the OFDM transceiver 300 includes transmitter circuitry with an inverse fast Fourier transform (IFFT) block 302 and a cyclic prefix insertion block 304 for generating transmit data for transmission via channel 306. The OFDM transceiver 300 further includes a cyclic prefix removal block 308 to remove the cyclic prefix from data received via the channel 306, an FFT block 310, and an equalizer block 312.

The SC-FDE transceiver 301 includes transmitter circuitry with a cyclic prefix insertion block 314 for generating transmit data for transmission via channel 316. The SC-FDE transceiver 301 further includes an FFT block 318 for processing data received via the channel 316, an equalizer block 320, an IFFT block 322, and a GI removal block 324. The transceivers 300 and 301 can further include a demodulation block and a decoding block. In some aspects, transceivers 300 and 301 further include a channel estimator block for generating a channel estimate for the equalizer block. The channel estimator can generate the channel estimate using the received signal as well as a DM-RS associated with the received signal. Techniques disclosed herein can be used for providing long transmission duration for systems operating at above 52.6 GHz carrier frequency. For transceiver 301 operating in connection with an SC-FDE transmission scheme, at the receiver, the FFT (e.g., block 318) is applied to convert the received signal from a time domain to a frequency domain. Subsequently, a linear equalizer (e.g., block 320) is performed in the frequency domain and followed by IFFT (e.g., block 322) to covert the signal from the frequency domain back to the time domain.

As defined in NR, one slot has 14 symbols. For systems operating above 52.6 GHz carrier frequency, if larger sub-carrier spacing is used (e.g., 960 kHz or 1920 kHz), the slot duration can be very short. For instance, for 960 kHz subcarrier spacing, one slot duration is approximately 15 μs. This extremely short slot duration may not be sufficient for higher layer processing, including Medium Access Control (MAC) layer and Radio Link Control (RLC) signaling. In this regard, techniques disclosed herein can be used to configure long transmission duration and adequate processing time for higher layers. More specifically, techniques disclosed herein can be used for configuring long transmission duration for system operating above 52.6 GHz carrier frequency, and for DM-RS enhancement for long transmission duration for system operating above 52.6 GHz carrier frequency.

The following techniques disclosed herein can be used to configure long transmission duration for system operating above 52.6 GHz carrier frequency.

In some aspects, default slot duration can be defined for the transmission of synchronization signal (SS) and physical broadcast channel (PBCH). Further, the slot duration for the transmission of common control messages including paging, random access response (RAR), system information, may use a default slot duration, e.g., 1 slot. Alternatively, the slot duration for the transmission of common control messages may be configured by higher layers via NR minimum system information (MSI) and NR remaining minimum system information (RMSI).

In some aspects, the slot duration for the transmission of common control message including paging and RAR may be configured by other system information (OSI).

In some aspects, the transmission including Msg. 2/3/4 and the transmission before RRC connection setup during a random access channel (RACH) procedure may use the default slot duration, which can be configured by MSI or RMSI.

In some aspects, for data transmission scheduled by non-fall-back downlink control information (DCI) or DCI format 1_1, slot aggregation can be employed and one transport block (TB) may span multiple slots. Further, the number of slots for data transmission can be configured by higher layers via radio resource control (RRC) signalling or dynamically indicated in the DCI, or a combination thereof. In the latter case, a set of values for the number of slots can be configured by higher layers and one field in the DCI can be used to indicate which one value from the set of values is used as the number of slots for data transmission. For example, the number of slots may be included as a part of time domain resource allocation field in the DCI, which can be combined with scheduling offset (K0 for PDSCH scheduling, K2 for PUSCH scheduling), data transmission mapping type A or B and starting length indicator value (SLIV).

In some aspects, when the UE is not configured with the number of slots for data transmission, the UE may use the default number of slots for data transmission, which may be configured by RMSI or may be predefined, e.g. 1 slot, based on current subcarrier spacing or based on a predefined subcarrier spacing.

In some aspects, for data transmission scheduled by fallback DCI or DCI format 1_0, default slot duration may be utilized, which may be configured by RMSI or MSI or be predefined, e.g. 1 slot, based on current subcarrier spacing or based on a predefined subcarrier spacing. In this case, the field which is used to indicate the number of slots for non-fallback DCI may not be included.

In some aspects, slot duration for DL and UL transmission may be separately configured by higher layers via MSI, RMSI, OSI, or RRC signalling. In other words, the number of slots for DL and UL data transmission may be different.

In some aspects, the slot duration for the transmission of physical control channel including physical downlink control channel (PDCCH), physical uplink control channel (PUCCH), and physical random access channel (PRACH), and/or the configuration and transmission of physical signals including Channel-state information reference signal (CSI-RS) and sounding reference signal (SRS) can be based on the default slot duration, which is configured by higher layers via RMSI and/or MSI.

In some aspects, in case when the slot duration for the data transmission is larger than 1 default slot duration, transport block size (TBS) may be calculated based on the total number of symbols within aggregated slots.

In some aspects, the specification for TBS calculation of PDSCH transmission in Section 5.1.3.2 in 3GPP TS 38.214 is described as follows:

A UE first determines the number of REs allocated for PDSCH within a PRB ($N'_{RE}$) by $N'_{RE}=N_{sc}^{RB} \cdot N_{symb}^{sh} - N_{DMRS}^{PRB} - N_{oh}^{PRB}$, where $N_{sc}^{RB}=12$ is the number of subcarriers in a physical resource block, $N_{symb}^{sh}$ is the number of symbols of the PDSCH allocation within the slot or within a number of slots if the number of slot indicated in the DCI is greater than 1, $N_{DMRS}^{PRB}$ is the number of REs for DM-RS per PRB in the scheduled duration including the overhead of the DM-RS CDM groups without data, as indicated by DCI format 1_1 or as described for format 1_0 in Subclause 5.1.6.2, and $N_{oh}^{PRB}$ is the overhead configured by higher layer parameter xOverhead in PDSCH-ServingCellConfig. If the xOverhead is not configured (a value from 0, 6, 12, or 18), the $N_{oh}^{PRB}$ is set to 0. If the PDSCH is scheduled by PDCCH with a CRC scrambled by SI-RNTI, RA-RNTI or P-RNTI, $N_{oh}^{PRB}$ is assumed to be 0.

In some aspects, the specification for TBS calculation of PUSCH transmission in Section 6.1.4.2 in 3GPP TS 38.214 is described as follows:

A UE first determines the number of REs allocated for PUSCH within a ($N'_{RE}$) by $N'_{RE}=N_{sc}^{RB}*N_{symb}^{sh} - N_{DMRS}^{PRB} - N_{oh}^{PRB}$, where $N_{sc}^{RB}=12$ is the number of subcarriers in the frequency domain in a physical resource block, $N_{symb}^{sh}$ is the number of symbols of the PUSCH allocation within the slot or within a number of slots if the number of slot indicated in the DCI is greater than 1, $N_{DMRS}^{PRB}$ is the number of REs for DM-RS per PRB in the scheduled duration including the overhead of the DM-RS CDM groups without data, as indicated by DCI format 0_1 or as described for DCI format 0_0 in Subclause 6.2.2, and $N_{oh}^{PRB}$ is the overhead configured by higher layer parameter xOverhead in PUSCH-ServingCellConfig. If the $N_{oh}^{PRB}$ is not configured (a value from 0, 6, 12, or 18), the $N_{oh}^{PRB}$ is assumed to be 0. For MSG3 transmission the $N_{oh}^{PRB}$ is always set to 0.

In some aspects, during the slot aggregation, the time domain resource allocation may need to be updated to allow the consecutive transmission within multiple slots. More specifically, there is no gap in the time domain for the data transmission within aggregated slots.

Figure 4:
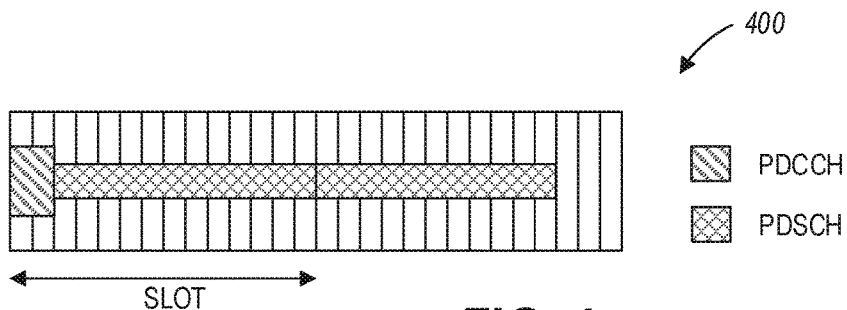
FIG. 4 illustrates consecutive data transmissions in connection with slot aggregation, in accordance with some aspects.

FIG. 4 illustrates an example 400 of consecutive data transmissions in connection with slot aggregation, in accordance with some aspects. In the example, 2 slots are allocated for data transmission and consecutive symbols within two slots are used for data transmission.

In some aspects, the time domain resource allocation may be updated accordingly. In one aspect, the starting length indicator value (SLIV) may be reused. However, the starting symbol may be used to indicate the starting symbol in the first slot within aggregated slots, while the starting symbol plus a duration is used for the ending symbol in the last slot within aggregated slots.

In some aspects, in the time domain resource allocation field in the DCI, the starting and ending symbols are indicated in each row of the table. Further, the starting symbol is used to indicate the starting symbol in the first slot within aggregated slots, while the ending symbol is used for the ending symbol in the last slot within aggregated slots.

In some aspects, the starting symbol and length in SLIV and the number of slots in the time domain resource allocation field are jointly used to indicate the starting symbol in the first slot and ending symbol in the last slot within aggregated slot. In particular, the starting symbol in SLIV is used to indicate the starting symbol in the first slot within aggregated slots. The combination of the starting symbol and length in SLIV and the number of slots in the time domain resource allocation field are jointly used to indicate the ending symbol in the last slot within aggregated slots.

In some aspects, the length of scheduled data transmission can be indicated in accordance with the length of symbol group, wherein the symbol group consists of a group of symbols. The symbol group size can be predefined in the specification or configured by higher layers via MSI, RMSI, OSI or RRC signalling. In one example, assuming symbol group size as K, and the length of scheduled data transmission can be derived from the length indicated by SLIV (assuming M), which can be given by L=MK, where L is the length of scheduled data transmission.

In some aspects, the Quasi-Co-Location (QCL) assumption for slot aggregation is determined by the scheduling offset for the first slot. In another word, the PDSCH in all slots within a transmission occasion can be with the same QCL assumption. If the scheduling offset for the first slot is below a threshold UE reported, a default QCL can be assumed, e.g. the QCL for the Control Resource Set (CORESET) in the latest slot with lowest ID; otherwise the QCL can be determined by the scheduling PDCCH, e.g. QCL is indicated by the DCI or the same QCL assumption applied to both scheduling PDCCH and PDSCH if not indicated by DCI. Alternatively, the scheduling offset for the first slot may be above the threshold UE reported or the scheduling offset for the last slot should be within the threshold UE reported.

In some aspects, the following techniques disclosed herein can be used to configure demodulation reference signal (DM-RS) enhancement for long transmission duration for system operating above 52.6 GHz carrier frequency.

In some aspects, DM-RS density can be reduced for data transmission with slot aggregation, which can help to improve the data rate and overall spectrum efficiency. In particular, DM-RS symbols may not be present in some of slots during slot aggregation.

In some aspects, the DM-RS pattern within the aggregated slots for data transmission with slot aggregation may be configured by higher layers via NR minimum system information (MSI), NR remaining minimum system information (RMSI), NR other system information (OSI) or radio resource control (RRC) signalling, or may be dynamically indicated in the DCI or a combination thereof. In the latter case, a set of DM-RS patterns for data transmission with slot aggregation can be configured by higher layers via RRC signalling. Further, one field in the DCI may be used to indicate which one DM-RS pattern is selected from the set of the configured DM-RS patterns.

Figure 5:
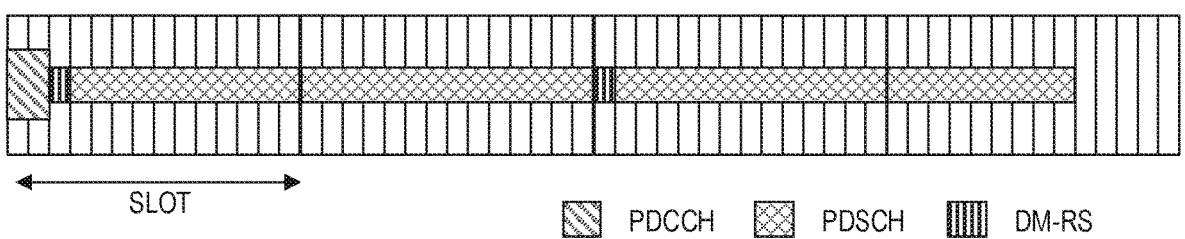
FIG. 5 illustrates a DM-RS pattern for data transmission with slot aggregation, in accordance with some aspects.

In some aspects, the DM-RS may be present in all even slots within the aggregated slots where the slot 0 is the first scheduled slot for data transmission. FIG. 5 illustrates an example 500 of a DM-RS pattern for data transmission with slot aggregation, in accordance with some aspects. In the example, one transport block (TB) spans four slots and front-loaded DM-RS symbol is inserted in the first and third slot within aggregated slots for data transmission with slot aggregation.

In some aspects, the DM-RS may be roughly equally distributed within the data transmission duration. Assuming N symbols are allocated for data transmission with slot aggregation, the DM-RS symbols may be transmitted at $k_0+\lfloor b*N/M \rfloor$-th symbol for n=0, 1, ..., M−1, where $k_0$ is the index of the first DM-RS symbol in the first slot, M is the number of DM-RS symbols within aggregated slots.

Figure 6:
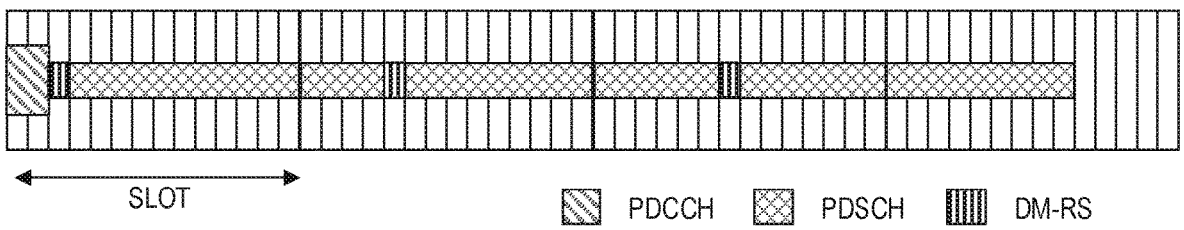
FIG. 6 illustrates another DM-RS pattern for data transmission with slot aggregation, in accordance with some aspects.

FIG. 6 illustrates an example 600 of another DM-RS pattern for data transmission with slot aggregation, in accordance with some aspects. In the example, 3 DM-RS symbols are equally distributed within 48 symbols for data transmission.

In some aspects, only front-loaded DM-RS can be present in every slot without additional DM-RS symbols. This can be used as a default configuration for DM-RS configured with fallback DCI, i.e., format 1_0.

In some aspects, to support cross-slot channel estimation, the UE may have the information that whether it can assume the same precoders are applied to the DM-RS in different slots. In one option, such information can be predefined, e.g. UE can assume the same precoder or different precoders are used in DM-RS in different slots. In another aspect, the gNB can indicate such information via DCI or RRC signaling or a combination thereof, and by default UE can assume the same precoder or different precoders are used in DM-RS in different slots.

In some aspects, for DCI formats 1_1 and 1_0, additional signaling signalling support can be introduced to indicate that no other UEs are configured with DM-RS ports on the same CDM group, via frequency domain orthogonal cover code (FD-OCC) based multiplexing. Specifically, for the case of rank 1 transmission, additional entry in DM-RS antenna port indication table (e.g., as provided in TS 38.212) can be added to ensure SU-MIMO operation can be signaled. Additionally, in case of rank 2 operation, for Type 1 and Type 2 DM-RS, different combs can be used to multiplex the 2 DM-RS ports of a UE without using FD-OCC. This can help the UE to avoid de-spreading of FD-OCC and will aid in PTRS based CPE estimation which is degraded in presence of high phase noise due to this de-spreading operation.

Figure 7:
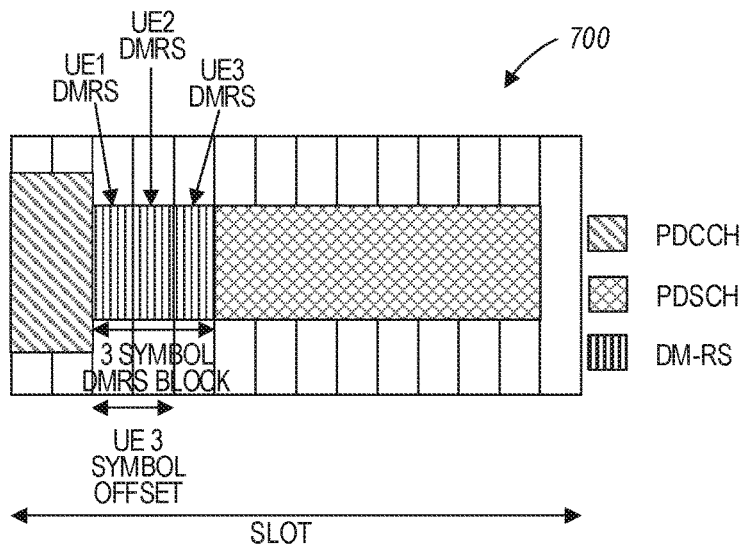
FIG. 7 illustrates an example of a 3-symbol DM-RS block where the DM-RS for each UE is present in one symbol of the blog in TDM manner, in accordance with some aspects.

In some aspects, a DM-RS pattern consisting of a block of N DM-RS symbols whereby ports from different UEs are multiplexed on different symbols in TDM manner can be introduced. This aspect enables MU-MIMO operation using the DM-RS block. The size of the DM-RS block N can be configured by RRC. In this case, in addition to choice of a DM-RS pattern, the DCI can also dynamically indicate the symbol offset relative to the starting symbol of the DM-RS block to enable the UE to determine the symbol on which its DM-RS is present. This option is illustrated in FIG. 7. FIG. 7 illustrates an example 700 of a 3-symbol DM-RS block where the DM-RS for each UE is present in one symbol of the blog in TDM manner, in accordance with some aspects.

In some aspects, for transmission rank higher than 1, the UE can occupy ports on multiple symbols and the DCI offset indicates the starting symbol of the DM-RS port assignment within the N symbol DM-RS block.

Figure 8:
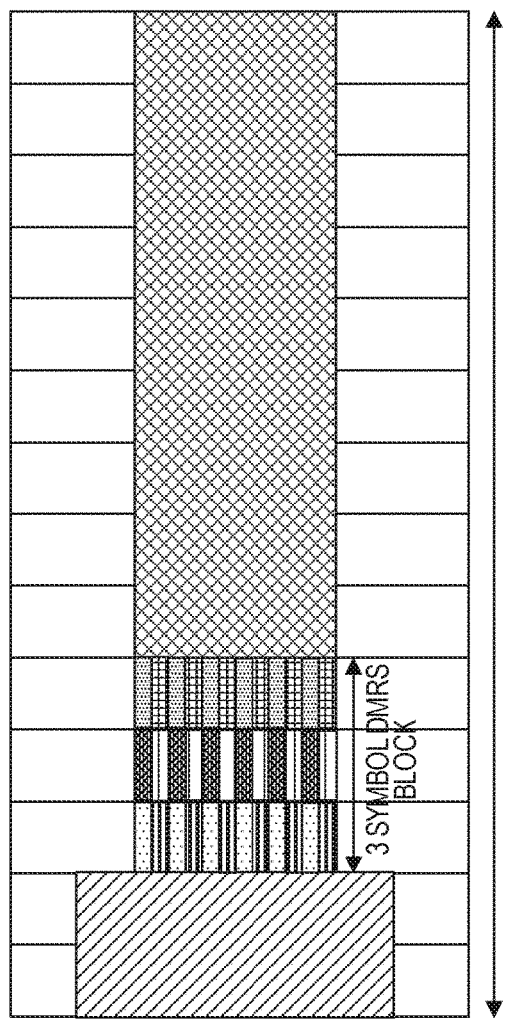
FIG. 8 illustrates an example of a 3-symbol DM-RS block based on type I DM-RS pattern with six DM-RS sports multiplexed in FDM and TDM manner, in accordance with some aspects.

In another option, each DM-RS block can also use Type 1 DM-RS pattern on each symbol of the DM-RS block to multiplex 2 orthogonal DM-RS ports (one on each comb) or Type 2 DM-RS pattern on each symbol of the DM-RS block to multiplex 3 orthogonal DM-RS ports (one on each comb). In this case if a DM-RS block consists of N symbols, a Type 1 DM-RS block can support 2N orthogonal DM-RS ports, while a Type 2 DM-RS block can support 3N orthogonal DM-RS ports. The option for Type 1 DM-RS is illustrated in FIG. 8. FIG. 8 illustrates an example 800 of a 3-symbol DM-RS block based on type I DM-RS pattern with six DM-RS sports multiplexed in FDM and TDM manner, in accordance with some aspects.

In some aspects and in connection with any of the aforementioned options, PDSCH multiplexing in the DMRS symbols may not be allowed.

A system and method of wireless communication for a fifth generation (5G) or new radio (NR) system includes: indicated, by gNodeB (gNB), a default slot duration for control channel transmission and/or slot duration for data transmission; transmitted, by gNB, the control channel in accordance with the default slot duration and the data channel in accordance with the indicated slot duration. A default slot duration can be defined for the transmission of synchronization signal (SS) and physical broadcast channel (PBCH). Slot duration for the transmission of common control messages including paging, random access response (RAR), system information, may use the default slot duration, e.g., 1 slot. The transmission including Msg. 2/3/4 and the transmission before RRC connection setup during random access procedure (RACH) may use the default slot duration which can be configured by NR minimum system information (MSI) or NR remaining minimum system information (RMSI). For data transmission scheduled by non-fallback downlink control information (DCI) or DCI format 1_1, slot aggregation can be employed and one transport block (TB) may span multiple slots.

For data transmission scheduled by fallback DCI or DCI format 1_0, default slot duration may be utilized, which may be configured by RMSI or MSI or be predefined, e.g. 1 slot based on current subcarrier spacing or a predefined subcarrier spacing. The slot duration for the transmission of physical control channel including physical downlink control channel (PDSCH), physical uplink control channel (PUCCH), and physical random access channel (PRACH) and/or the configuration and transmission of physical signals including Channel-state information reference signal (CSI-RS) and sounding reference signal (SRS) can be based on the default slot duration, which is configured by higher layers via RMSI and/or MSI. The slot duration for the data transmission is larger than 1 default slot duration, transport block size (TBS) may be calculated based on the total number of symbols within aggregated slots.

The starting symbol and length in starting length indicator value (SLIV) and the number of slots in the time domain resource allocation field are jointly used to indicate the starting symbol in the first slot and ending symbol in the last slot within aggregated slot. The length of scheduled data transmission can be indicated in accordance with the length of symbol group, where the symbol group consists of a group of symbols. The symbol group size can be predefined in the specification or configured by higher layers via NR minimum system information (MSI), NR remaining minimum system information (RMSI), NR other system information (OSI) or radio resource control (RRC) signalling.

DM-RS density can be reduced for data transmission with slot aggregation. The DM-RS pattern within the aggregated slots for data transmission with slot aggregation may be configured by higher layers via NR minimum system information (MSI), NR remaining minimum system information (RMSI), NR other system information (OSI) or radio resource control (RRC) signalling or dynamically indicated in the DCI or a combination thereof. The DM-RS may be present in all even slots within the aggregated slots where the slot 0 is the first scheduled slot for data transmission. The DM-RS may be roughly equally distributed within the data transmission duration. gNB can indicate the information whether it can assume the same precoders are applied to the DMRS in different slots via DCI or RRC signaling or a combination thereof, and by default UE can assume the same precoder or different precoders are used in DMRS in different slots. For DCI formats 1_1 and 1_0, additional signaling signalling support can be introduced to indicate that no other UEs are configured with DMRS ports on the same CDM group, via frequency domain orthogonal cover code (FD-OCC) based multiplexing. A DMRS pattern consisting of a block of N DMRS symbols, whereby ports from different UEs are multiplexed on different symbols in TDM manner can be introduced.

Figure 9:
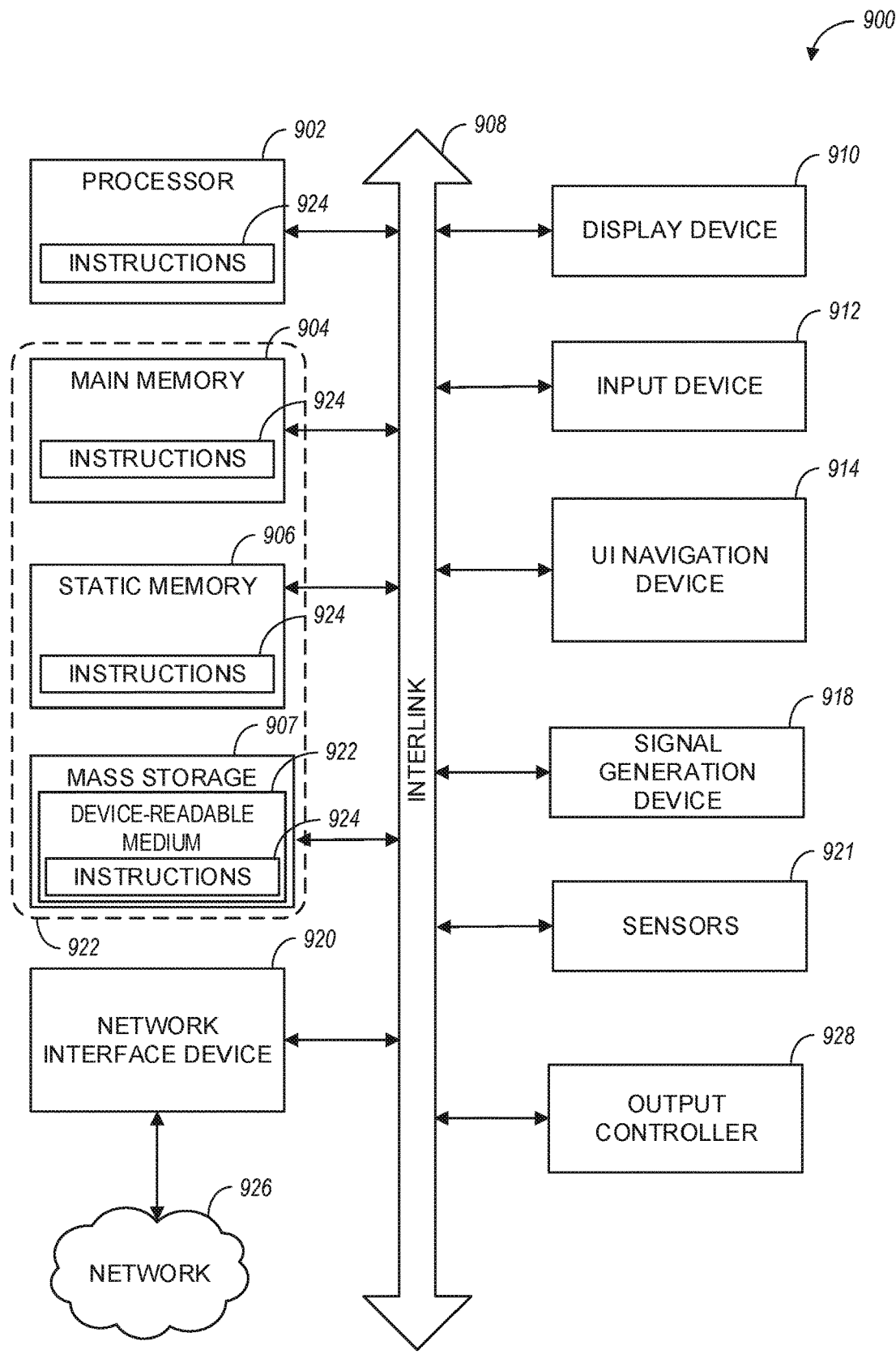
FIG. 9 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 9 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 900 may operate as a standalone device or may be connected (e.g., networked) to other communication devices.

Circuitry (e.g., processing circuitry) is a collection of circuits implemented intangible entities of the device 900 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired).

In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 900 follow.

In some aspects, the device 900 may operate as a standalone device or may be connected (e.g., networked) to other devices. In a networked deployment, the communication device 900 may operate in the capacity of a server communication device, a client communication device, or both in server-client network environments. In an example, the communication device 900 may act as a peer communication device in peer-to-peer (P2P) (or other distributed) network environment. The communication device 900 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 900 may include a hardware processor 902 (e.g., a central processing unit (CPU), a graphics processing unit (GPU), a hardware processor core, or any combination thereof), a main memory 904, a static memory 906, and mass storage 907 (e.g., hard drive, tape drive, flash storage, or other block or storage devices), some or all of which may communicate with each other via an interlink (e.g., bus) 908.

The communication device 900 may further include a display device 910, an alphanumeric input device 912 (e.g., a keyboard), and a user interface (UI) navigation device 914 (e.g., a mouse). In an example, the display device 910, input device 912 and UI navigation device 914 may be a touchscreen display. The communication device 900 may additionally include a signal generation device 918 (e.g., a speaker), a network interface device 920, and one or more sensors 921, such as a global positioning system (GPS) sensor, compass, accelerometer, or another sensor. The communication device 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 907 may include a communication device-readable medium 922, on which is stored one or more sets of data structures or instructions 924 (e.g., software) embodying or utilized by any one or more of the techniques or functions described herein. In some aspects, registers of the processor 902, the main memory 904, the static memory 906, and/or the mass storage 907 may be, or include (completely or at least partially), the device-readable medium 922, on which is stored the one or more sets of data structures or instructions 924, embodying or utilized by any one or more of the techniques or functions described herein. In an example, one or any combination of the hardware processor 902, the main memory 904, the static memory 906, or the mass storage 916 may constitute the device-readable medium 922.

As used herein, the term "device-readable medium" is interchangeable with "computer-readable medium" or "machine-readable medium". While the communication device-readable medium 922 is illustrated as a single medium, the term "communication device-readable medium" may include a single medium or multiple media (e.g., a centralized or distributed database, and/or associated caches and servers) configured to store the one or more instructions 924. The term "communication device-readable medium" is inclusive of the terms "machine-readable medium" or "computer-readable medium", and may include any medium that is capable of storing, encoding, or carrying instructions (e.g., instructions 924) for execution by the communication device 900 and that cause the communication device 900 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 924 may further be transmitted or received over a communications network 926 using a transmission medium via the network interface device 920 utilizing any one of a number of transfer protocols. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input-multiple-output (SIMO), MIMO, or multiple-input-single-output (MISO) techniques. In some examples, the network interface device 920 may wirelessly communicate using Multiple User MIMO techniques.

The term "transmission medium" shall be taken to include any intangible medium that is capable of storing, encoding or carrying instructions for execution by the communication device 900, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus of a user equipment (UE), the apparatus comprising:
    processing circuitry, wherein to configure the UE for New Radio (NR) communications above a 52.6 GHz carrier frequency, the processing circuitry is to:
        decode higher layer signaling, the higher layer signaling including a default slot duration for a transmission of control signaling, wherein the control signaling includes a synchronization signal (SS) and a physical broadcast channel (PBCH) signaling;
        decode synchronization information within a SS block, the SS block received within a SS burst set and occupying a plurality of symbols within a first slot having the default slot duration;
        perform a synchronization procedure with a next generation Node-B (gNB) based on the synchronization information within the SS block; and decode downlink data received via a physical downlink shared channel (PDSCH) during a data transmission by the gNB, the downlink data occupying a second slot, the second slot having a default slot duration for the data transmission; and memory coupled to the processing circuitry, the memory configured to store the higher layer signaling.

2. The apparatus of claim 1, wherein the processing circuitry is further to:

decode a master information block (MIB), the MIB received via the PBCH and within the first slot having the default slot duration;

perform an initial cell selection of a cell of the gNB based on the MIB.

3. The apparatus of claim 1, wherein the higher layer signaling includes at least one of the following:

NR minimum system information (MSI) signaling received via the PBCH;

NR remaining minimum system information (RMSI) received via a physical downlink shared channel (PDSCH); and other system information (OSI) signaling.

4. The apparatus of claim 1, wherein the processing circuitry is further to:

decode second higher layer signaling, the second higher layer signaling including the default slot duration for the data transmission by the gNB.

5. The apparatus of claim 1, wherein the processing circuitry is further to:

decode downlink control information (DCI), the DCI scheduling a downlink data transmission and indicating a transport block (TB) of the downlink data transmission spans multiple slots; and decode downlink data scheduled by the DCI and received via the indicated transport block on a physical downlink shared channel (PDSCH).

6. The apparatus of claim 5, wherein the DCI is DCI format 1_1 or non-fall-back DCI format, and wherein a number of slots in the TB is included in a time domain resource allocation field in the DCI.

7. The apparatus of claim 1, wherein the processing circuitry is further to:

decode downlink control information (DCI) format 1_0 or fall-back DCI format, the DCI scheduling a downlink data transmission based on the default slot duration; and decode downlink data scheduled by the DCI format 1_0 or fall-back DCI format and received based on the default slot duration on a physical downlink shared channel (PDSCH).

8. The apparatus of claim 1, wherein the default slot duration is configured based on a current subcarrier spacing used for the NR communications above the 52.6 GHz carrier frequency.

9. The apparatus of claim 1, wherein the higher layer signaling includes information to configure slot duration separately for uplink (UL) and downlink (DL) transmissions.

10. The apparatus of claim 1, wherein the higher layer signaling includes information to configure slot duration for transmission of Message 2, Message 3, or Message 4 of a random access channel (RACH) procedure.

11. The apparatus of claim 1, further comprising transceiver circuitry coupled to the processing circuitry; and, one or more antennas coupled to the transceiver circuitry.

12. A non-transitory computer-readable storage medium that stores instructions for execution by one or more processors of a base station, the instructions to configure the base station for New Radio (NR) communications above a 52.6 GHz carrier frequency and to cause the base station to:

encode higher layer signaling for transmission to a user equipment (UE), the higher layer signaling including a default slot duration for a transmission of control signaling, wherein the control signaling includes a synchronization signal (SS) and a physical broadcast channel (PBCH) signaling;

encode synchronization information within a SS block, the SS block transmitted within a SS burst set and occupying a plurality of symbols within a first slot having the default slot duration;

perform a synchronization procedure with the UE based on the synchronization information within the SS block; and decode downlink data received via a physical downlink shared channel (PDSCH) during a data transmission by the gNB, the downlink data occupying a second slot, the second slot having a default slot duration for the data transmission.

13. The non-transitory computer-readable storage medium of claim 12, wherein execution of the instructions further cause the base station to:

encode a master information block (MIB) for transmission via the PBCH and within the first slot having the default slot duration.

14. The non-transitory computer-readable storage medium of claim 12, wherein execution of the instructions further cause the base station to:

encode downlink control information (DCI), the DCI scheduling a downlink data transmission and indicating a transport block (TB) of the downlink data transmission spans multiple slots; and encode downlink data scheduled by the DCI, for transmission via the indicated transport block on a physical downlink shared channel (PDSCH).

15. A non-transitory computer-readable storage medium that stores instructions for execution by one or more processors of a user equipment (UE), the instructions to configure the UE for New Radio (NR) communications above a 52.6 GHz carrier frequency and cause the UE to:

decode higher layer signaling, the higher layer signaling including a default slot duration for a transmission of control signaling, wherein the control signaling includes a synchronization signal (SS) and a physical broadcast channel (PBCH) signaling;

decode synchronization information within a SS block, the SS block received within a SS burst set and occupying a plurality of symbols within a first slot having the default slot duration;

perform a synchronization procedure with a next generation Node-B (gNB) based on the synchronization information within the SS block; and decode downlink data received via a physical downlink shared channel (PDSCH) during a data transmission by the gNB, the downlink data occupying a second slot, the second slot having a default slot duration for the data transmission.

16. The non-transitory computer-readable storage medium of claim 15, wherein execution of the instructions further cause the UE to:

decode a master information block (MIB), the MIB received via the PBCH and within the first slot having the default slot duration;

perform an initial cell selection of a cell of the gNB based on the MIB.

17. The non-transitory computer-readable storage medium of claim 15, wherein the higher layer signaling includes at least one of the following:
- NR minimum system information (MSI) signaling received via the PBCH;
- NR remaining minimum system information (RMSI) received via a physical downlink shared channel (PDSCH); and
- other system information (OSI) signaling.

18. The non-transitory computer-readable storage medium of claim 15, wherein execution of the instructions further cause the UE to:
- decode second higher layer signaling, the second higher layer signaling including the default slot duration for the data transmission by the gNB.

19. The non-transitory computer-readable storage medium of claim 15, wherein execution of the instructions further cause the UE to:
- decode downlink control information (DCI), the DCI scheduling a downlink data transmission and indicating a transport block (TB) of the downlink data transmission spans multiple slots; and
- decode downlink data scheduled by the DCI and received via the indicated transport block on a physical downlink shared channel (PDSCH).

20. The non-transitory computer-readable storage medium of claim 15, wherein execution of the instructions further cause the UE to:
- decode downlink control information (DCI) format 1_0 or fall-back DCI format, the DCI scheduling a downlink data transmission based on the default slot duration; and
- decode downlink data scheduled by the DCI format 1_0 or fall-back DCI format and received based on the default slot duration on a physical downlink shared channel (PDSCH).

* * * * *